(12) United States Patent
Liao et al.

(10) Patent No.: US 7,868,982 B2
(45) Date of Patent: Jan. 11, 2011

(54) PIXEL STRUCTURE OF A COLOR FILTERING ARRAY SUBSTRATE

(75) Inventors: Chi-Nan Liao, Taoyuan (TW); Liang-Bin Yu, Taoyuan (TW); Yuh-Huah Wang, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 52 days.

(21) Appl. No.: 12/365,471

(22) Filed: Feb. 4, 2009

(65) Prior Publication Data

US 2009/0135353 A1 May 28, 2009

Related U.S. Application Data

(62) Division of application No. 11/533,704, filed on Sep. 20, 2006, now Pat. No. 7,643,120.

(30) Foreign Application Priority Data

Mar. 20, 2006 (TW) ............................. 95109403 A

(51) Int. Cl.
*G02F 1/1343* (2006.01)

(52) U.S. Cl. ...................................... 349/139; 349/142
(58) Field of Classification Search ................. 349/139, 349/142, 33
See application file for complete search history.

(56) References Cited

U.S. PATENT DOCUMENTS

| 7,142,259 B2 * | 11/2006 | Hattori et al. .................. 349/33 |
| 2003/0011729 A1 * | 1/2003 | Song et al. .................... 349/107 |
| 2004/0183981 A1 * | 9/2004 | Yamakita ...................... 349/143 |
| 2005/0128407 A1 * | 6/2005 | Lee et al. ...................... 349/141 |
| 2005/0259197 A1 * | 11/2005 | Hirai et al. .................... 349/113 |

* cited by examiner

*Primary Examiner*—Mark A Robinson
*Assistant Examiner*—Eric Wong
(74) *Attorney, Agent, or Firm*—J.C. Patents

(57) ABSTRACT

A pixel structure of a color filtering array substrate includes a color filtering layer, a black matrix layer, and an electrode layer. The black matrix layer surrounds the color filtering layer. The electrode layer covers the color filtering layer and the black matrix layer. Besides, the electrode layer has at least one opening therein, and the opening is located above the black matrix layer.

4 Claims, 13 Drawing Sheets

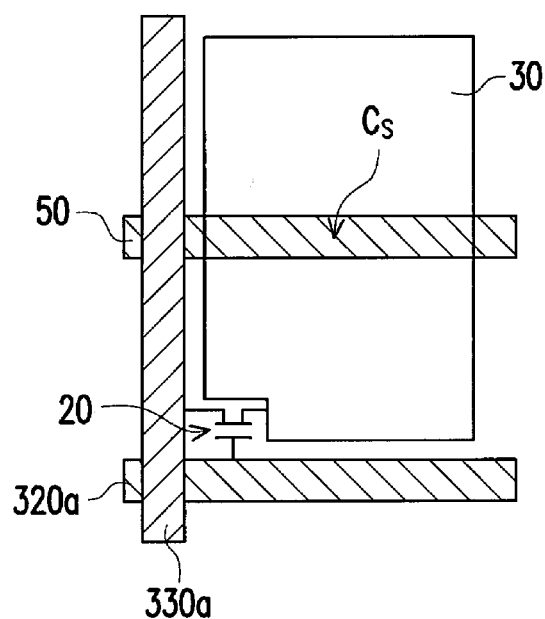
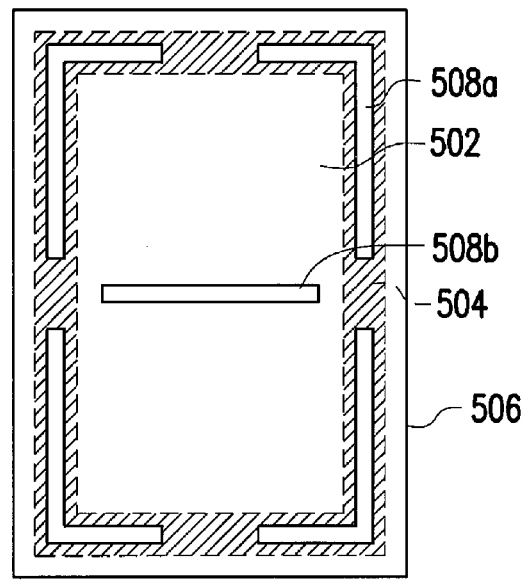
FIG. 3A   FIG. 3B
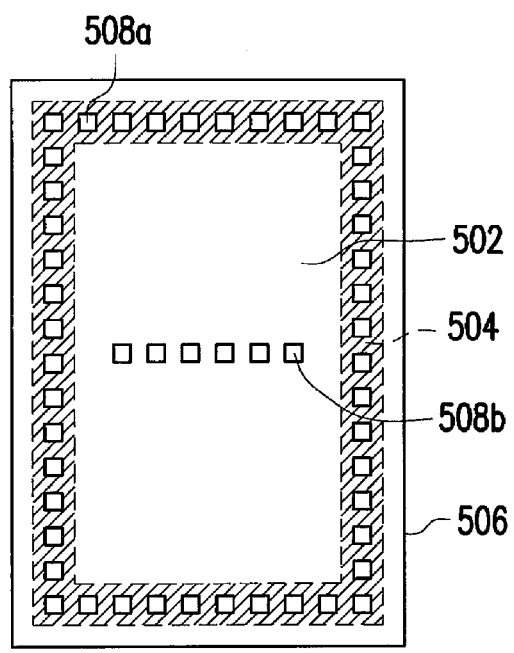
FIG. 4

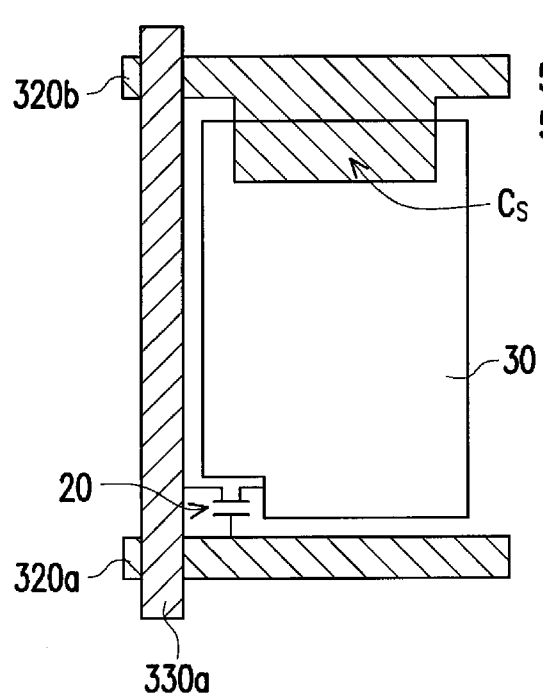
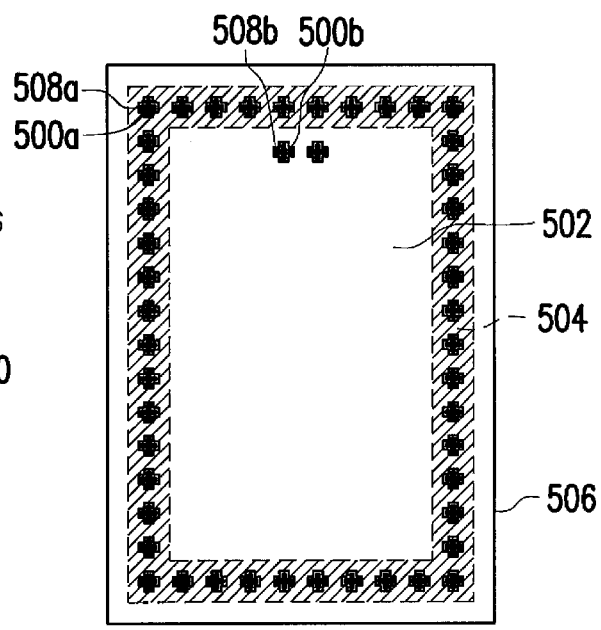
FIG. 11A    FIG. 11B
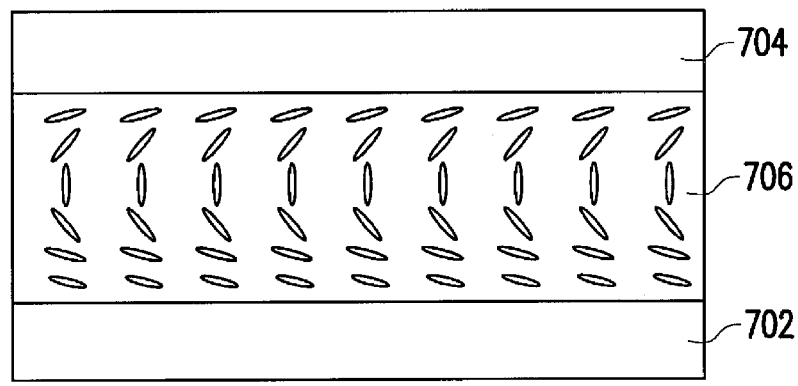
FIG. 12

PIXEL STRUCTURE OF A COLOR FILTERING ARRAY SUBSTRATE

CROSS-REFERENCE TO RELATED APPLICATION

This application is a divisional of and claims priority benefit of an application Ser. No. 11/533,704, filed on Sep. 20, 2006, now pending, which claims the priority benefit of Taiwan application serial no. 95109403, filed on Mar. 20, 2006. The entirety of each of the above-mentioned patent applications is hereby incorporated by reference herein and made a part of this specification.

BACKGROUND OF THE INVENTION

1. Field of the Invention

The present invention relates to a pixel structure and a display panel, and more particularly, to a pixel structure and a liquid crystal display panel suitable for an optically compensated birefringence liquid crystal display (OCB LCD).

2. Description of the Related Art

Since the demand of the display is increased gradually, the display vendors have dedicated themselves in developing new display techniques. Since the cathode ray tube (CRT) is advantageous in its better display quality and technology maturity, it has dominated the display market for a long time. However, since the concept of green environment is widely accepted recently, due to its characteristics of consuming more energy and generating more radiation, and little improvement in flattening its product, the CRT is not able to meet the market trend of being lighter, thinner, shorter, smaller, and having lower power consumption. Accordingly, the thin film transistor liquid crystal display (TFT-LCD) with superior characteristics of high picture quality, effectiveness of space utilization, low power consumption, no radiation, has gradually become the main stream in the display market.

Depending on various types of the liquid crystal, the driving methods, and the locations where the light source is disposed, the liquid crystal display can be classified as many different types. In particular, the optically compensated birefringence liquid crystal display (OCB LCD) has extremely fast response speed and is also capable of providing smooth pictures when the computer is playing the continuous pictures with fast changes such as the motion pictures or movies, thus it is suitable for applying in the high end liquid crystal display panel. However, the OCB LCD can enter into the standby mode for improving its fast response performance only when some liquid crystal molecules are transited from the splay state to the twist state and eventually transited to the bend state.

FIG. 1A is a schematic view of the liquid crystal molecules with the splay state in the liquid crystal display panel, and FIG. 1B is a schematic view of the liquid crystal molecules with the bend state in the liquid crystal display panel. Referring to FIGS. 1A and 1B, in the OCB LCD 10, a liquid crystal layer 11 is disposed between a top substrate 12 and a bottom substrate 13. The top substrate 12 and the bottom substrate 13 have their respective alignment layers (not shown) whose rubbing directions are parallel to each other. The liquid crystal molecules in the liquid crystal layer 11 are arranged with the splay state when there is no external electric field applied thereon. In case the OCB LCD desires entering into the standby mode, an electric field perpendicular to the top substrate 12 should be applied onto the liquid crystal molecules, such that some liquid crystal molecules can gradually transit to the twist state, and then transit to the bend state. In the conventional OCB LCD, this transition takes a couple of minutes to normally drive the pixels, in other words, a long time of warm up is required before the OCB LCD can enter into the standby mode. However, this problem is disadvantageous to the "ready-to-use" property of the liquid crystal display panel. Accordingly, a fast transition is required for the customers to easily accept the OCB LCD.

In order to have the liquid crystal molecules in the OCB LCD transit from the splay state to the bend state more quickly, a more intensive electric field is generated by increasing the voltage in the prior art, such that the liquid crystal molecules can quickly transit from the splay state to the bend state. However, since it is very hard to obtain the appropriate driving chip that is capable of enduring the high voltage, it is quite difficult to develop and massively produce such products. The other commonly used method in the conventional technique is adding the polymer into the liquid crystal layer. In such case, when the liquid crystal molecules are in the bend state, the ultraviolet (UV) is emitted onto the polymer to form a polymer wall, such that the liquid crystal molecules are sustained to be arranged with the bend state. Although such method is quite simple, a light leakage phenomenon will occur in the OCB LCD. In addition, other methods are available, for example, forming slits on the pixel electrode or forming protrusions above the pixel structure by applying a special pixel design, such that the arrangement of the liquid crystal molecules in some areas is changed, and the speed of transiting from the splay state to the bend state is improved.

SUMMARY OF THE INVENTION

Therefore, the present invention is directed to a pixel structure of an active device array substrate for quickly transiting the liquid crystal molecules in the OCB LCD from the splay state to the bend state.

The present invention is further directed to a pixel structure of a color filtering array substrate for quickly transiting the liquid crystal molecules in the OCB LCD from the splay state to the bend state.

The present invention is further directed to a liquid crystal display panel with a fast response time.

In the present invention, a pixel structure is provided. The pixel structure comprises a scan line, a data line, an active device, a pixel structure, and at least one island electrode. The active device is electrically coupled to the scan line and the data line. The pixel electrode is electrically coupled to active device, wherein the pixel electrode has at least one opening therein. The island electrode is disposed inside the opening, wherein the island electrode is electrically coupled to a voltage V, and the pixel electrode is electrically coupled to a driving voltage $V_d$ that is different from the voltage V, such that a transverse electric field is formed between the island electrode and the pixel electrode.

In accordance with an embodiment of the present invention, the pixel structure of the active device array substrate further comprises a capacitance electrode disposed between the substrate and the pixel electrode, and the capacitance electrode is electrically coupled to the island electrode. In an embodiment, the capacitance electrode mentioned above is a common line. In another embodiment, the capacitance electrode mentioned above is a next scan line adjacent to the scan line.

In accordance with an embodiment of the present invention, the pixel structure of the active device array substrate further comprises an alignment layer disposed on the pixel electrode and the island electrode, and the alignment layer has an alignment direction that is different from that of the transverse electric field.

In accordance with an embodiment of the present invention, the pixel electrode is made of a material the same as that for the island electrode.

The present invention further provides a pixel structure of a color filtering array substrate comprising a color filtering layer, a black matrix layer, and an electrode layer. The black matrix layer surrounds the color filtering layer. The electrode layer covers the color filtering layer and the black matrix layer, wherein the electrode layer has at least one opening therein, and the opening is located above the black matrix layer.

In accordance with an embodiment of the present invention, the pixel structure of the color filtering array substrate further comprises at least one island electrode disposed inside the opening, and the island electrode is electrically insulated from the electrode layer.

In accordance with an embodiment of the present invention, the electrode layer mentioned above is electrically coupled to a common voltage $V_c$, and the island electrode is electrically coupled to a voltage V, wherein the common voltage $V_c$ is different from the voltage V.

In accordance with an embodiment of the present invention, the pixel electrode is made of a material the same as that for the island electrode. In accordance with an embodiment of the present invention, the opening mentioned above is further formed in the electrode layer above the color filtering layer, and the island electrode is disposed inside the opening.

In accordance with an embodiment of the present invention, the opening mentioned above is further formed in the electrode layer above the color filtering layer.

The present invention further provides a liquid crystal display panel comprising an active device array substrate, a color filtering array substrate, and a liquid crystal layer. The active device array substrate comprises a plurality of pixel structures, and each pixel structure comprises a scan line, a data line, an active device electrically coupled to the scan line and the data line, and a pixel electrode electrically coupled to the active device. The color filtering array substrate comprises a color filtering layer, a black matrix layer surrounding the color filtering layer, and an electrode layer covering the color filtering layer and the black matrix layer. Specifically, the electrode layer has at least one first opening that is correspondingly located above the black matrix layer. In addition, the liquid crystal layer is disposed between the active device array substrate and the color filtering array substrate.

In accordance with an embodiment of the present invention, the liquid crystal display panel of the present invention further comprises at least one first island electrode disposed in the first opening, and the first island electrode is electrically insulated from the electrode layer.

In accordance with an embodiment of the present invention, each pixel electrode of the active device array substrate mentioned above further comprises a capacitance electrode, and the first opening on the color filtering array substrate is formed in alignment with the capacitance electrode.

In accordance with an embodiment of the present invention, the liquid crystal display panel of the present invention further comprises at least one first island electrode disposed in the first opening, and the first island electrode on the first opening is correspondingly aligned with the capacitance electrode.

In accordance with an embodiment of the present invention, the pixel electrode mentioned above has at least one second opening in which a second island electrode is disposed, and a transverse electric field is formed between the second island electrode and the pixel electrode.

In accordance with an embodiment of the present invention, each pixel structure of the active device array substrate mentioned above further comprises a capacitance electrode that is electrically coupled to the second island electrode. In the pixel structure of the active device array substrate provided by the present invention, a transverse electric field is formed between the island electrode and the pixel electrode. Therefore, when the pixel structure of the present invention is applied in the OCB LCD, the arrangement of the liquid crystal molecules in some areas is changed. When the liquid crystal display panel displays an image, the rest of the liquid crystal molecules are quickly transited to the bend state, such that the response time of the liquid crystal display panel is effectively improved.

Similarly, in the pixel structure of the color filtering array substrate provided by the present invention, the electrode layer has at least one opening that is located above the black matrix layer. Therefore, when the pixel structure of the present invention is applied in the OCB LCD, the arrangement of the liquid crystal molecules in some areas is changed, which reduces the response time of the liquid crystal display panel, and the liquid crystal molecules in such area are shielded by the black matrix, such that the light leakage problem is eliminated.

BRIEF DESCRIPTION DRAWINGS

The accompanying drawings are included to provide a further understanding of the invention, and are incorporated in and constitute a portion of this specification. The drawings illustrate embodiments of the invention, and together with the description, serve to explain the principles of the invention.

FIG. 3A is a top view of a pixel structure of the active device array substrate according to an embodiment of the present invention, and FIG. 3B is a top view of a pixel structure of the color filtering array substrate according to an embodiment of the present invention.

FIGS. 4 to 10 show the top views of the pixel structure of the color filtering array substrate according to the embodiments of the present invention, respectively.

FIG. 11A is a top view of a pixel structure of the active device array substrate according to another embodiment of the present invention, and FIG. 11B is a top view of a pixel structure of the color filtering array substrate according to another embodiment of the present invention.

FIG. 12 is a cross-sectional view of a liquid crystal display panel.

DESCRIPTION OF EMBODIMENTS

First Embodiment

Figure 1A:
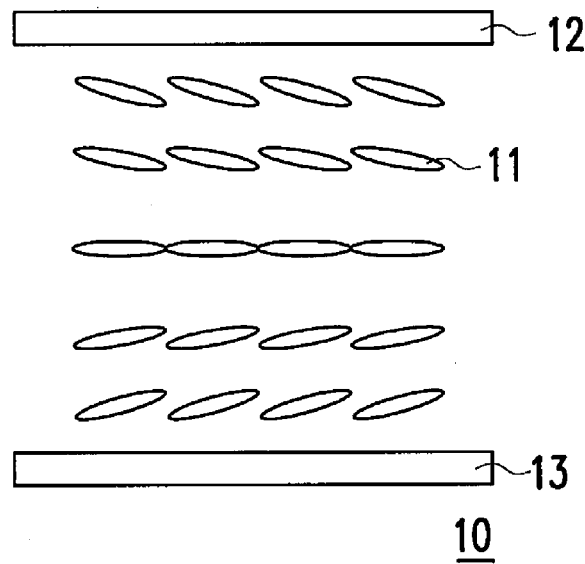
FIG. 1A is a schematic view of the liquid crystal molecules with the splay state in the liquid crystal display panel.
Figure 1B:
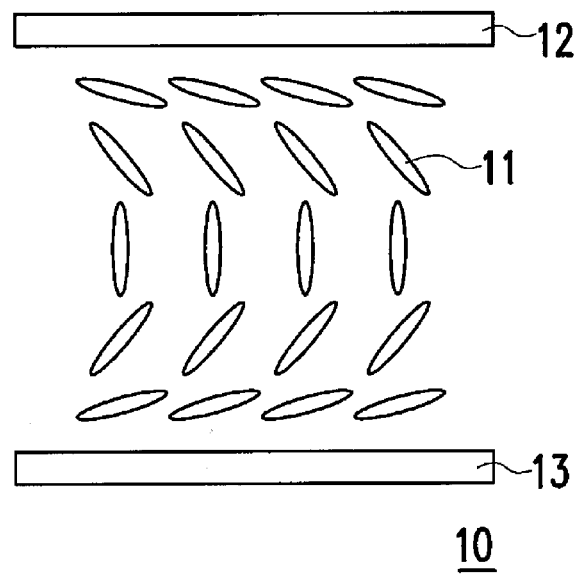
FIG. 1B is a schematic view of the liquid crystal molecules with the bend state in the liquid crystal display panel.
Figure 2A:
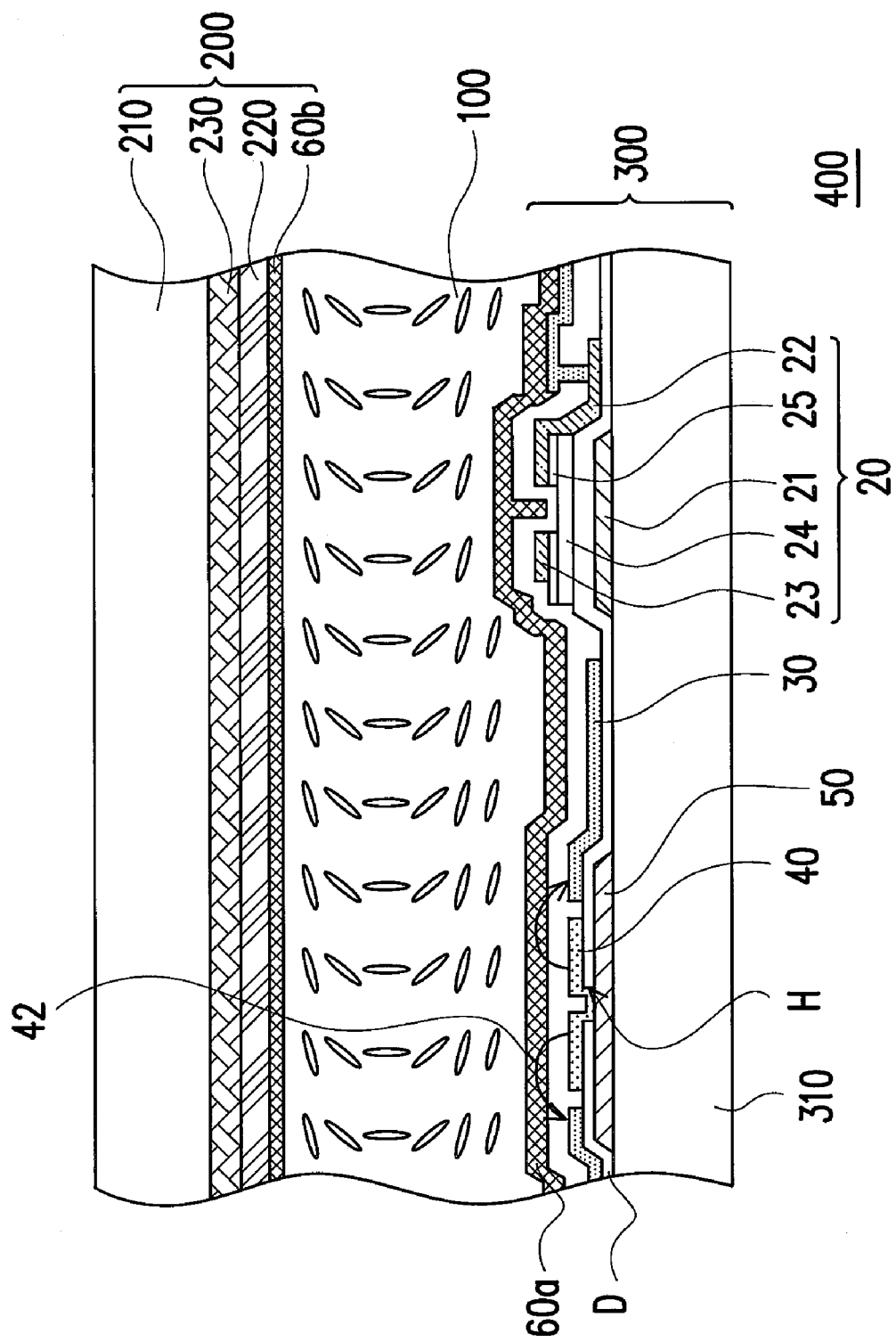
FIG. 2A is a cross-sectional view of a liquid crystal display panel according to the first embodiment of the present invention.
Figure 2B:
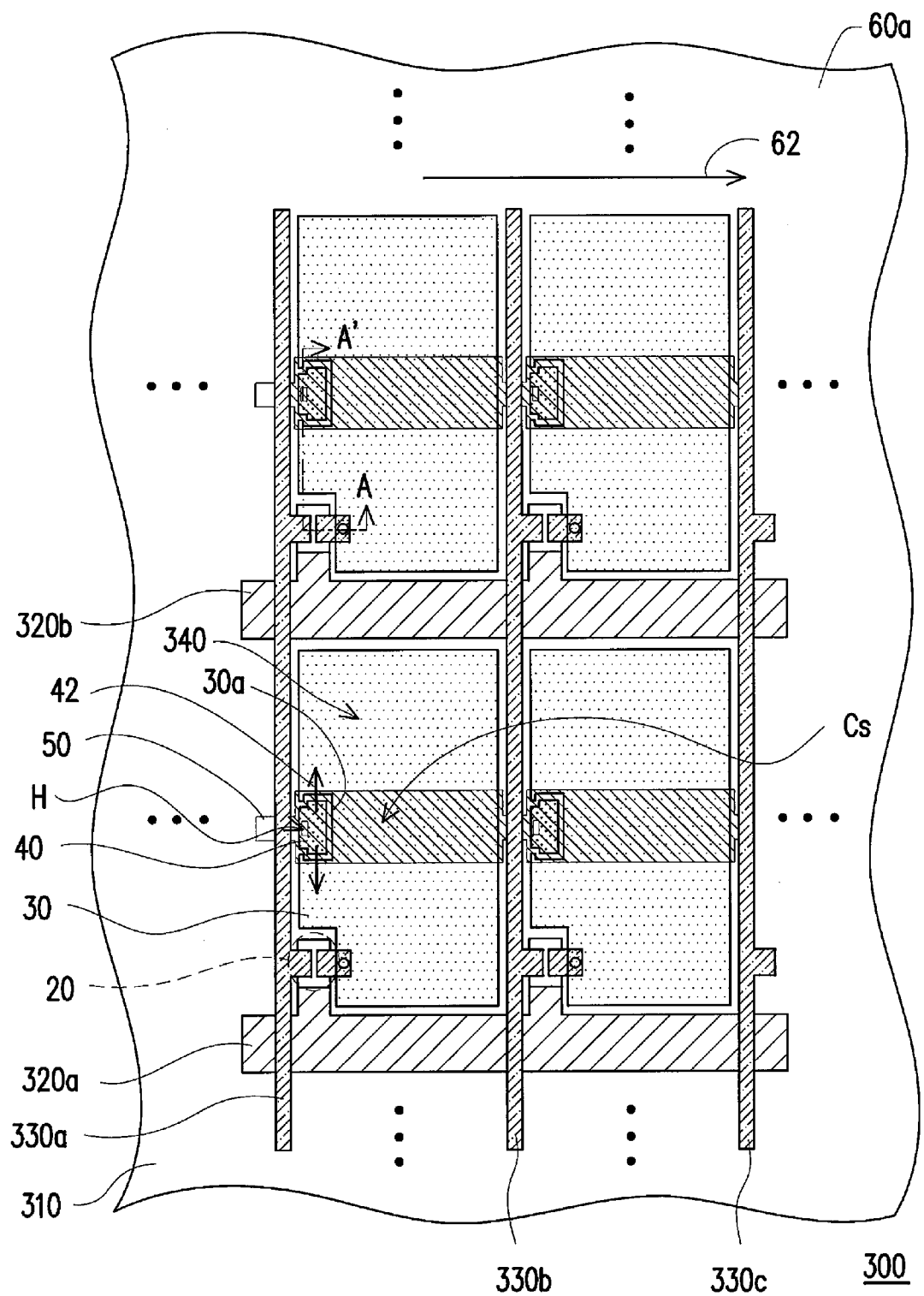
FIG. 2B is a top view of the active device array substrate in the liquid crystal display panel of FIG. 2A.
Figure 2C:
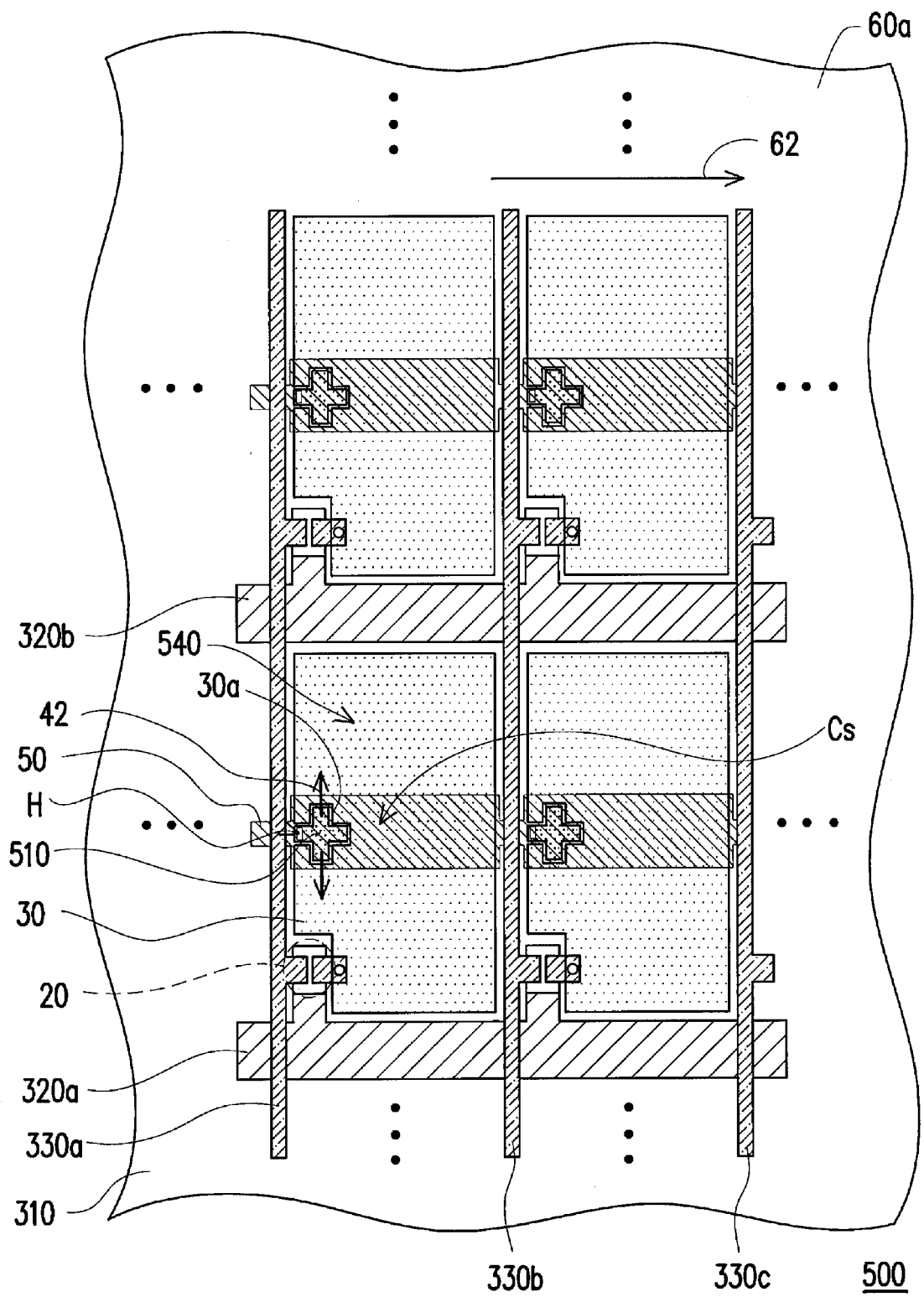
FIGS. 2C to 2G show the top views of the pixel structure of the active device array substrate according to the embodiments of the present invention, respectively.
Figure 2D:
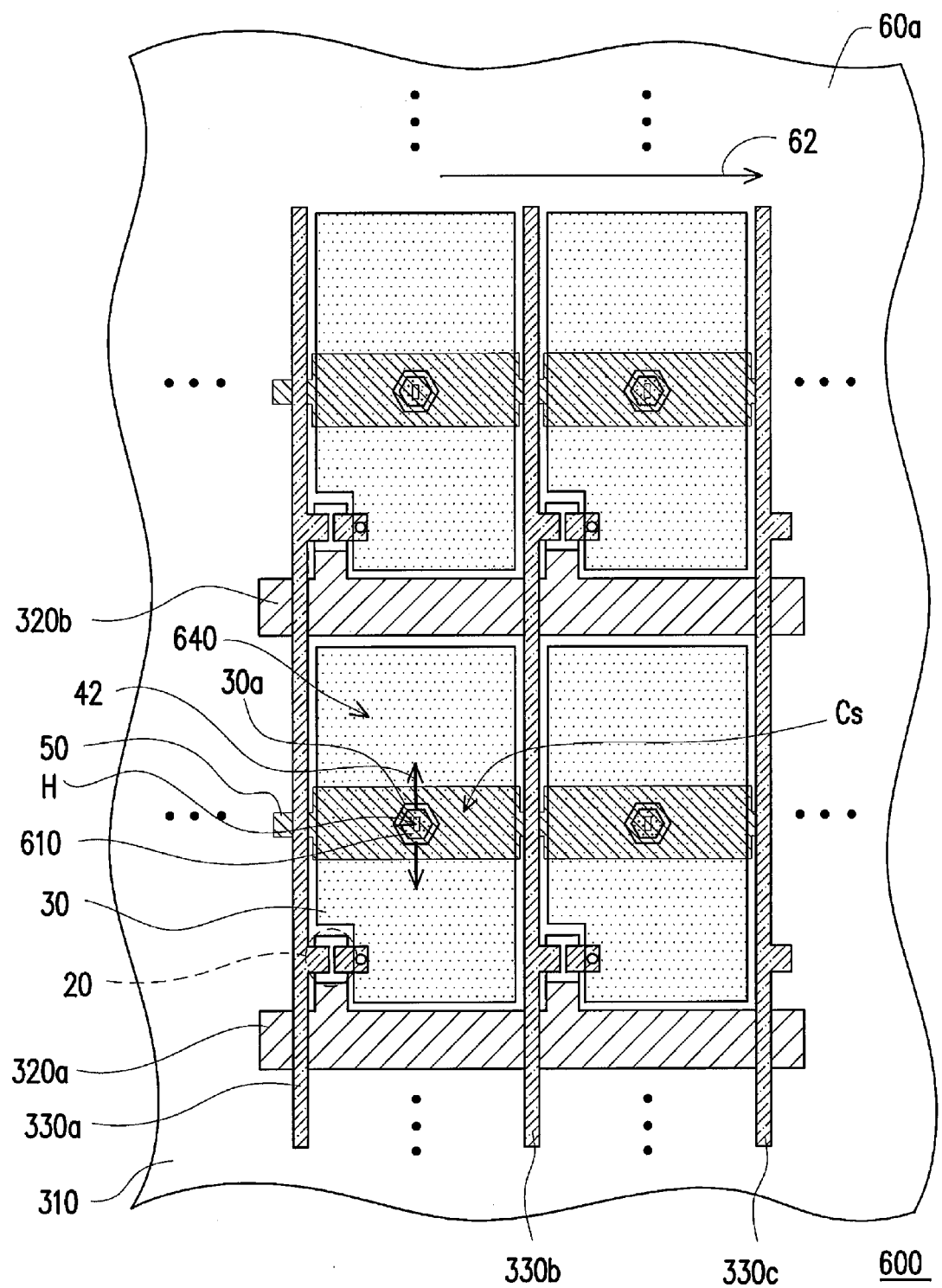
Figure 2E:
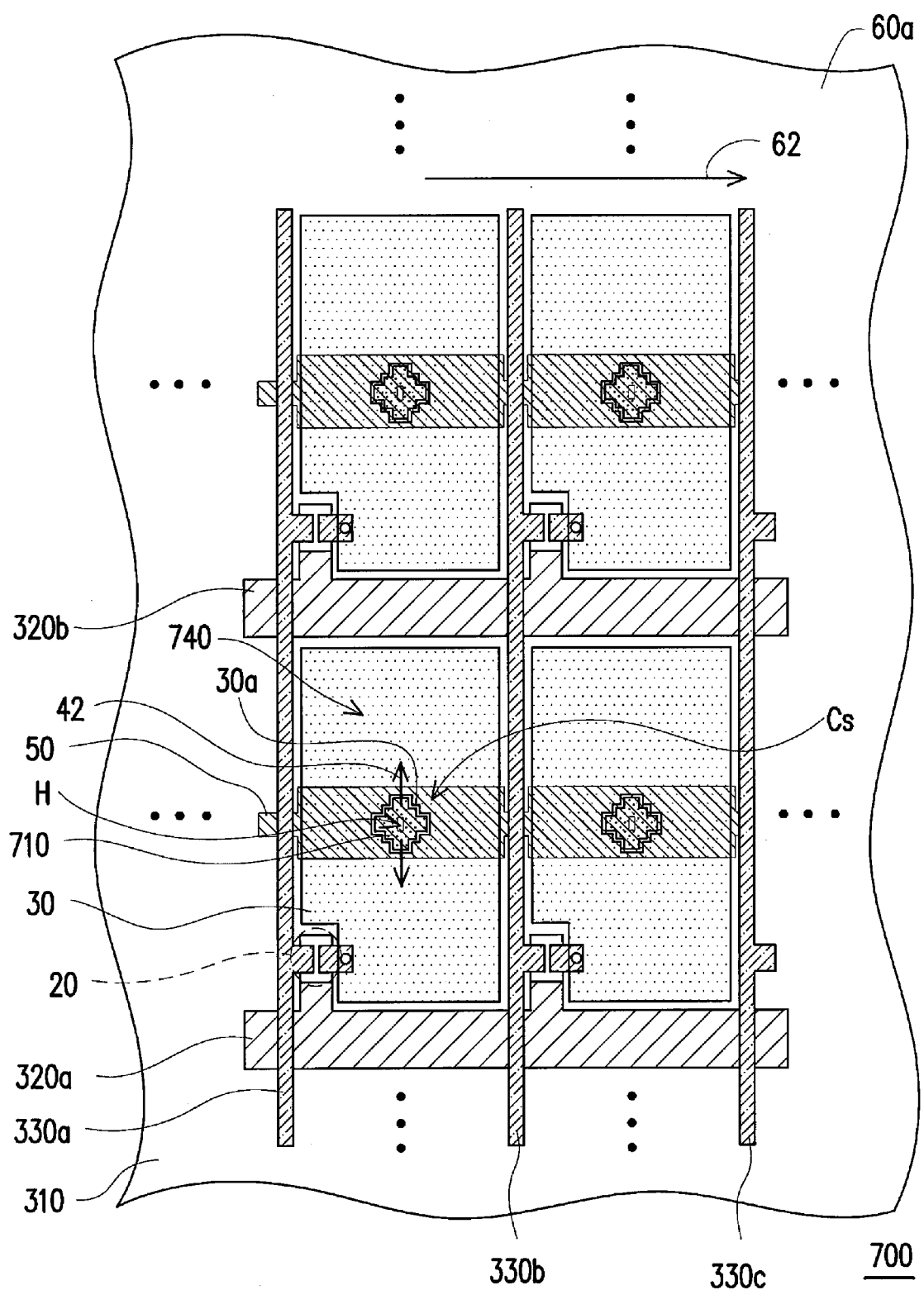
Figure 2F:
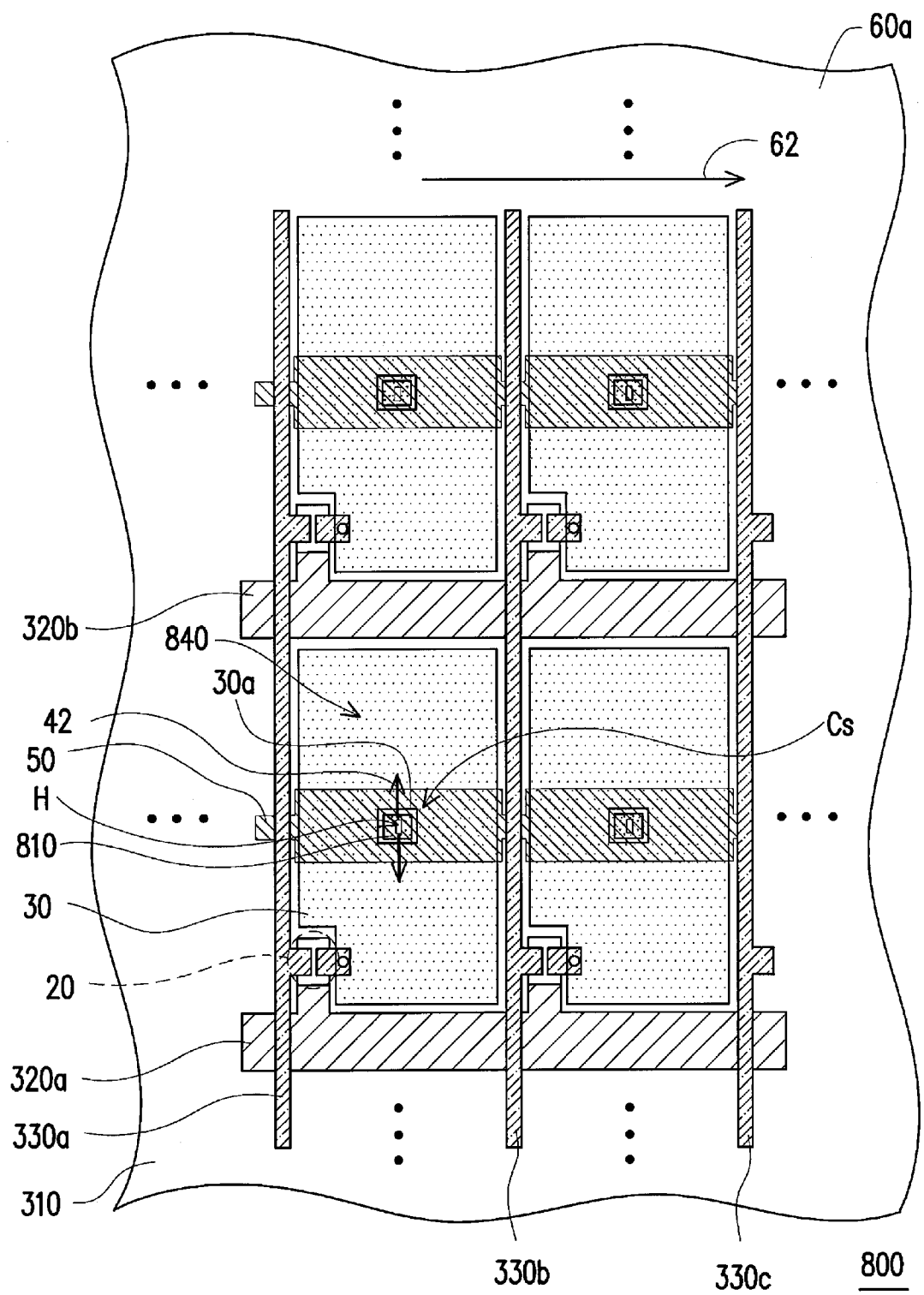

FIG. 2A is a cross-sectional view of a liquid crystal display panel according to a first embodiment of the present invention, and FIG. 2B is a top view of the active device array substrate in the liquid crystal display panel of FIG. 2A, wherein FIG. 2A is a cross-sectional diagram viewed from the cross-sectional line A-A' of FIG. 2B. Referring to FIGS. 2A and 2B, the liquid crystal display panel 400 is an OCB LCD. The liquid crystal display panel 400 comprises an active device array substrate 300, a color filtering array substrate 200, and a liquid crystal layer 100. The color filtering array substrate 200 is disposed above the active device array substrate 300, and the liquid crystal layer 100 is disposed between the color filtering array substrate 200 and the active device array substrate 300.

The active device array substrate 300 comprises a first substrate 100 and a plurality of pixel structures 340 disposed on the first substrate 310. Each of the first pixel structures 340 comprises one of the scan lines 320a and 320b, one of a plurality of data lines 330a, 330b and 330c, an active device 20, a pixel electrode 30, and an island electrode 40. The first substrate 30 is, for example, a glass substrate, a quartz substrate or a substrate made of other appropriate material. The scan lines 320a and 320b may be an aluminum alloy conductive wire or a conductive wire formed by other appropriate conductive material. The data lines 330a, 330b and 330c may be a chromium conductive wire, an aluminum alloy conductive wire or a conductive wire formed by other appropriate conductive material. The active device 20 is disposed on the first substrate 310, and each active device 20 is electrically coupled to one of the scan lines 320a and 320b and one of the data lines 330a, 330b and 330c. For example, the active device 20 marked in the bottom left of FIG. 2B is electrically coupled to the scan line 320a and the data line 330a. In addition, the pixel electrode 30 is electrically coupled to the active device 20.

As described, the active device 20 is, for example, a thin film transistor (TFT), a switch component with three terminals, or other appropriate components, and the active device 20 is electrically coupled to one of the scan lines 320a and 320b and one of the data lines 330a, 330b and 330c. In the present embodiment, the active device 20 is a TFT, and the active device 20 comprises a gate 21, a source 22, a drain 23, a channel layer 24, and an ohmic contact layer 25 (as shown in FIG. 2A). The pixel electrode 30 is, for example, a transmissive electrode, a reflective electrode, or a transflective electrode, and the pixel electrode 30 is made of a material such as indium tin oxide (ITO), indium zinc oxide (IZO), metals, or other transmissive or non-transmissive conductive material.

Specifically, the pixel electrode 30 has an opening 30a, and the island electrode 40 is disposed inside the opening 30a. Preferably, the island electrode 40 is made of a material the same as that for the pixel electrode 30. The shape of the island electrode 40 may be a circle, a polygon, or any other appropriate shape. To be more specific, the island electrode 40 is electrically insulated from the pixel electrode 30, and a transverse electric field 42 is formed between the island electrode 40 and the pixel electrode 30.

In an embodiment of the present invention, the pixel structure 340 further comprises a capacitance electrode 50 disposed between the first substrate 310 and the pixel electrode 30, and the capacitance electrode 50 is electrically coupled to the island electrode 40 through a contact H. In the preferred embodiment of the present invention, the island electrode 40 is disposed above the capacitance electrode 50, and the island electrode 40 is electrically coupled to the capacitance electrode 50 through the contact H. The island electrode 40 is disposed in an area where the capacitance electrode is disposed therein.

Moreover, the color filtering array substrate 200 comprises a second substrate 210, an electrode layer 220, and a color filtering layer 230. The second substrate 210 is, for example, a glass substrate, a quartz substrate or a substrate made of other appropriate material. The electrode layer 220 is made of a material such as indium tin oxide (ITO), indium zinc oxide (IZO), or other appropriate conductive material, and the electrode layer 220 is disposed above the second substrate 210. The color filtering layer 230 is disposed between the second substrate 210 and the electrode layer 220. For example, the color filtering layer 230 comprises a black matrix layer and a plurality of color filtering patterns (not shown).

In the present embodiment, the capacitance electrode 50 is a common line. In other words, all of the capacitance electrodes 50 in the same row or column together form a line. The pixel electrode 30, the capacitance electrode 50, and a dielectric layer D together form a storage capacitor Cs, and the pixel electrode 30 and the capacitance electrode 50 are served as the top electrode plate and the bottom electrode plate of the storage capacitor Cs, respectively. Namely, the storage capacitor Cs is the so-called storage capacitance on common.

Furthermore, the active device array substrate 300 further comprises an alignment layer 60a. The alignment layer 60a is, for example, made of polyimide resin (PI) or other appropriate material. The alignment layer 60a covers the pixel structure 304 and has an alignment direction 62. It is to be noted that the alignment direction 62 is different from that of the transverse electric field 42. In addition, an alignment layer 60b is further disposed on the electrode layer 220 of the color filtering array substrate 200, and the alignment direction of the alignment layer 60b is the same or in parallel with the alignment direction of the alignment layer 60a.

With such design of the pixel structure 340 in the liquid crystal display panel 400, the arrangement of the liquid crystal molecules in some areas is changed in advance. Usually, before the image is displayed on the liquid crystal display panel 400, the island electrode 40 of the pixel structure 340 and the corresponding capacitance electrode 50 are electrically coupled to a voltage V, and the corresponding pixel electrode 30 is electrically coupled to a driving voltage $V_d$. Here, the voltage V is, for example, a constant value, and the driving voltage $V_d$ varies according to the image to be displayed. It is to be noted that the voltage V is different from the driving voltage $V_d$. Therefore, a transverse electric field is formed between the island electrode 40 and the pixel electrode 30. In the liquid crystal layer 100, some liquid crystal molecules originally in the splay state are twisted and transited to the twist state by reacting to the transverse electric field. When the liquid crystal display panel 400 displays the image, a vertical electric field is applied on the liquid crystal layer 100. Since some liquid crystal molecules are already in the twist state, it can advantageously drive other liquid crystal molecules to the bend state quickly. Comparing to the case where all liquid crystal molecules are in the splay state, the present invention can quickly transit the liquid crystal molecules to the bend state. In other words, the liquid crystal display panel 400 can provide a fast response time under normal display driving.

In the embodiment of FIG. 2B, the island electrode 40 is a polygon shape electrode, and each capacitance electrode 50 is a common line. However, according to the present invention, the island electrode 40 is not limited to be the polygon shape electrode, and each capacitance electrode 50 may be a next scan line 320b adjacent to the scan line 320a. In the active device array substrates 500, 600, 700 and 800 of FIGS. 2C to 2F, the shape of the island electrodes 510, 610, 710 and 810 of the pixel structures 540, 640, 740 and 840 are polygons with different shapes. Of course, the shape of the island electrode, according to the present invention, is not limited to the shape shown in FIGS. 2B to 2F.

Figure 2G:
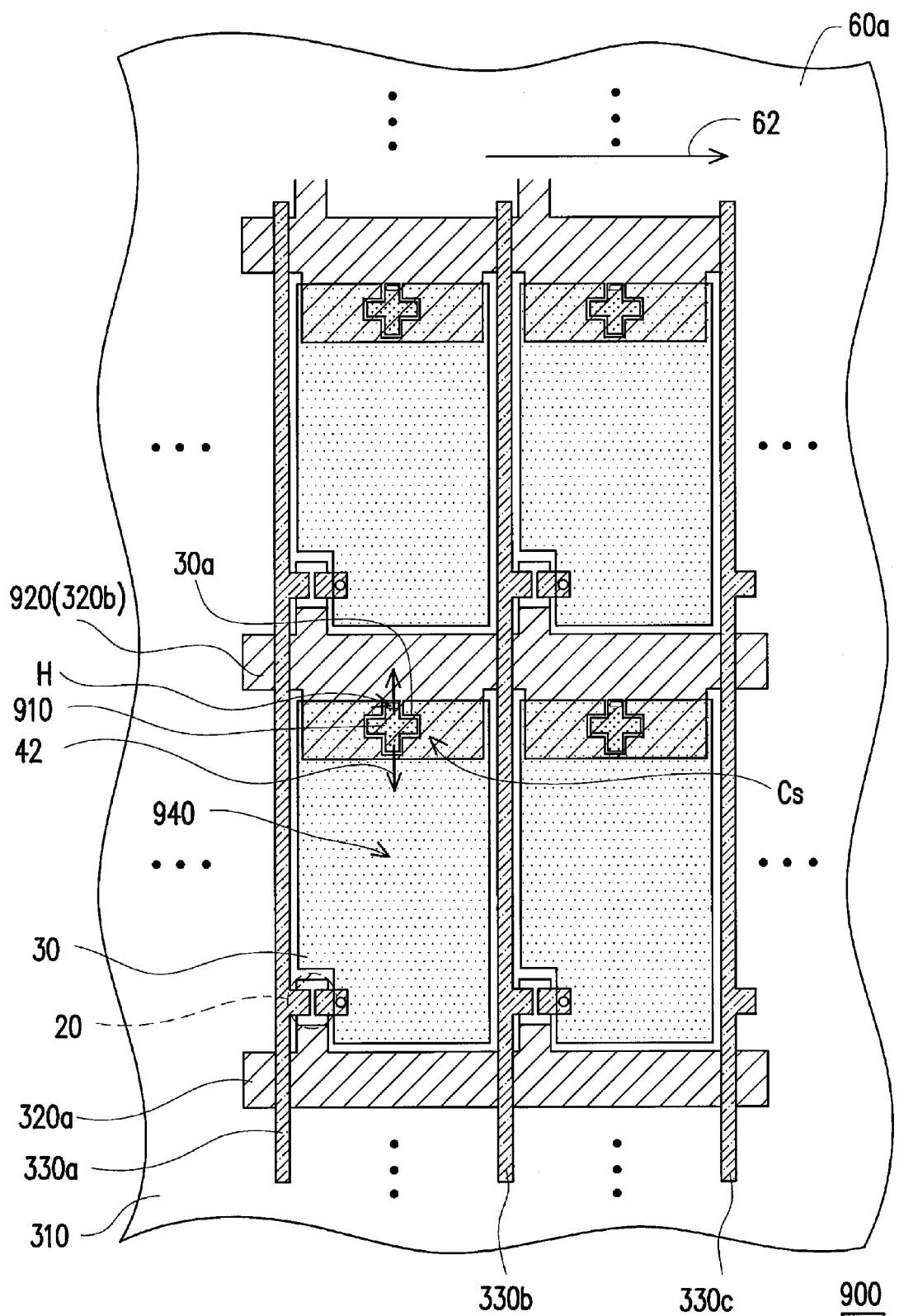

Moreover, in the active device array substrate 900 of FIG. 2G, the capacitance electrode 920 of the pixel structure 940 is a next scan line 320b adjacent to the scan line 320a. In the pixel structure 940, the pixel electrode 30, the capacitance electrode 920, and the dielectric layer D together form a storage capacitor Cs, and the pixel electrode 30 and the capacitance electrode 920 are served as the top electrode plate and the bottom electrode plate of the storage capacitor Cs, respectively. Namely, the storage capacitor Cs is the so-called storage capacitance on gate.

The pixel structures 540, 640, 740, 840 and 940 of FIGS. 2C to 2G have the same functions as that of the pixel structure 340 (referring to FIG. 2B) mentioned above. In other words, a transverse electric field 42 is formed between the pixel electrode 30 and the island electrodes 510, 610, 710, 810, 910 of the pixel structures 540, 640, 740, 840, 940. Accordingly, the liquid crystal display panel (not shown) made of such pixel structures 540, 640, 740, 840 and 940 can provide a fast response time.

Second Embodiment

In the first embodiment mentioned above, the opening and the island electrode are formed in the pixel electrode of the active device array substrate, such that the liquid crystal molecules in such area are stayed in the bend state, and the liquid crystal display panel can provide a fast response time under normal display driving. According to the present invention, the opening (and the island electrode) may be formed on the electrode layer of the color filtering array substrate, such design makes the liquid crystal molecules in such area stay in the bend state, and the liquid crystal display panel can provide a fast response time under normal display driving. The detail of forming the opening (and the island electrode) on the electrode layer of the color filtering array substrate is described in greater detail hereinafter.

FIG. 3A is a top view of a pixel structure of the active device array substrate according to an embodiment of the present invention, and FIG. 3B is a top view of a pixel structure of the color filtering array substrate according to an embodiment of the present invention. After the active device array substrate and the color filtering array substrate are integrated into a piece, and a liquid crystal layer is filled between two substrates to form a liquid crystal display panel, the pixel structure of FIG. 3A and the pixel structure of FIG. 3B are overlaid or aligned with each other. Referring to FIG. 3A, the pixel structure of the active device array substrate comprises an active device 20, and a scan line 320a, a data line 330a and a pixel electrode 30 that are all electrically coupled to the active device 20. In an embodiment of the present invention, the pixel structure of the active device array substrate further comprises a capacitance electrode, and a storage capacitor Cs is formed between the capacitance electrode and the pixel electrode 30. The components of the pixel structure of the active device array substrate mentioned above has been described in the first embodiment, thus its detail is omitted herein.

Referring to FIG. 3B, the pixel structure of the color filtering array substrate comprises a color filtering layer 502, a black matrix 504, and an electrode layer 506. The color filtering layer 502 is, for example, a red (R), a green (G), or a blue (B) filtering layer. The black matrix 504 formed surrounding the color filtering layer 502 is made of a material such as metal or black resin. The present invention dose not limit the sequence of forming the black matrix 504 and the color filtering layer 502. In other words, the black matrix 504 may be formed before the color filtering layer 502; alternatively, the color filtering layer 502 may be formed before the black matrix 504. Moreover, the electrode layer 506 covers the color filtering layer 502 and the black matrix 504. In an embodiment of the present invention, a planarization layer (not shown) is further disposed beneath the electrode layer 506.

Specifically, an opening 508a formed in the electrode layer 506 is located in the electrode layer 506 above the black matrix 504. In another embodiment of the present invention, in addition to the opening 508a that is formed in the electrode layer 506 above the black matrix 504, an opening 508b is further formed in the electrode layer 506 above the color filtering layer 502. Preferably, the opening 508b is overlaid or aligned with the capacitance electrode 50 on the active device array substrate. Since the opening 508a (and 508b) is formed in the electrode layer 506, when a driving voltage is applied thereon to drive the liquid crystal display panel, a sub transverse electric field is formed near the opening 508a (and 508b) by the electric field between the scan line 320a and the data line 330a (or even the capacitance electrode 50) and the electrode layer 506, such that the liquid crystal molecules in such area are transited from the splay state to the twist state. Similarly, since some liquid crystal molecules are already in the twist state, it can advantageously drive the rest of the liquid crystal molecules to quickly transit to the bend state. Accordingly, the liquid crystal display panel can provide a fast response time under normal display driving.

It is to be noted that the opening 508a is formed in the electrode layer 506 above the black matrix 504 in the present invention, and the opening 508b is further formed in the electrode layer 506 on which the capacitance electrode 50 is disposed. In other words, the opening is formed in an area where is shielded by black matrix 504 or/and capacitance electrode 50 in the present invention, such that the light leakage problem, which may happen in the opening, is effectively eliminated. Moreover, if the openings are formed on the periphery of the pixel structure in the present invention, the operation range of the transverse electric field is increased, such that the liquid crystal molecules can quickly transit to the bend state.

Figure 5:
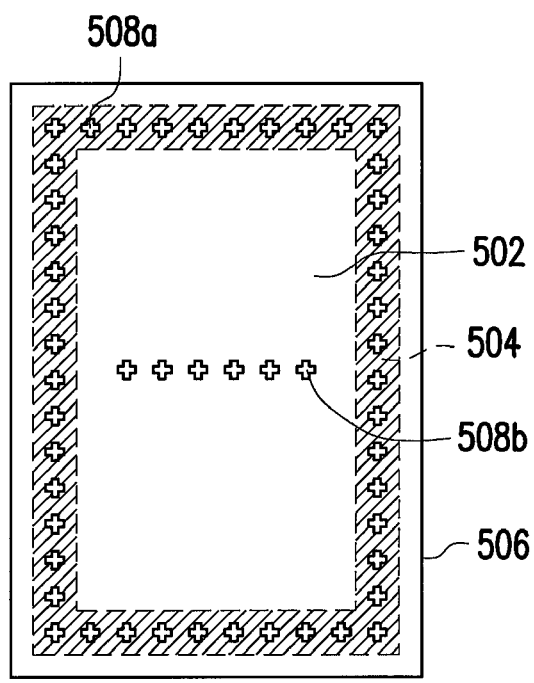
Figure 6:
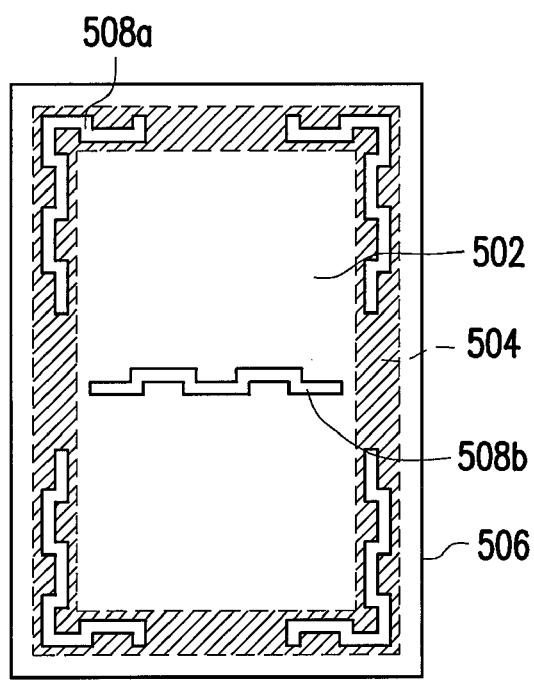

Although the openings 508a and 508b of FIG. 3B are slit openings, the present invention is not limited to the shape of the openings 508a and 508b. Rather, the openings 508a and 508b may be square holes or small round holes (as shown in FIG. 4), other polygons (as shown in FIG. 5), or bend slits (as shown in FIG. 6).

Figure 7:
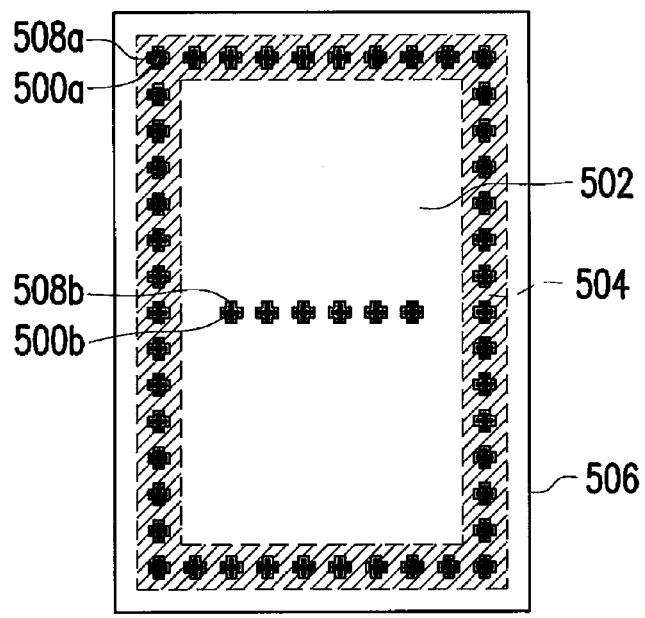

In accordance with another embodiment of the present invention, the island electrodes 500a and 500b may be further disposed inside the opening 508a (and 508b) as shown in FIG. 7, and the island electrodes 500a and 500b are electrically insulated from the electrode layer 506. In an embodiment of the present invention, the electrode layer 506 is electrically coupled to a common voltage $V_c$, and the island electrodes 500a and 500b are electrically coupled to a voltage V, wherein the common voltage $V_c$ is different from the voltage V. In addition, the electrode layer 506 is made of a material the same as that for the island electrodes 500a and 500b.

Figure 8:
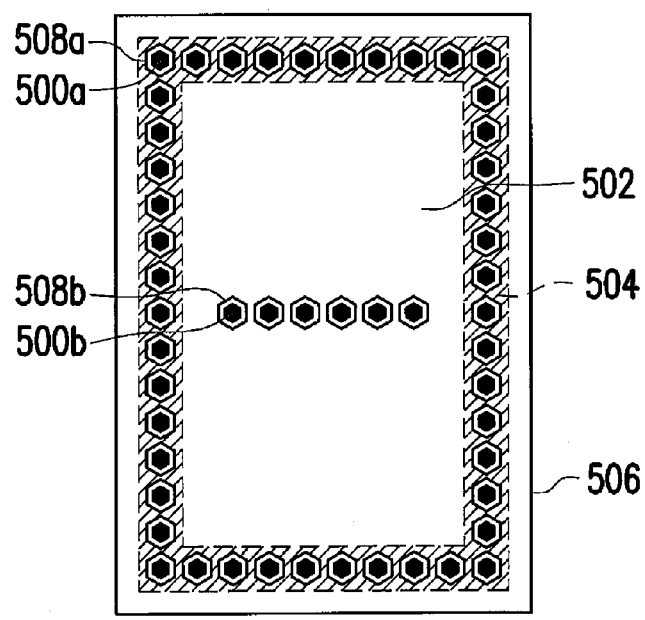
Figure 9:
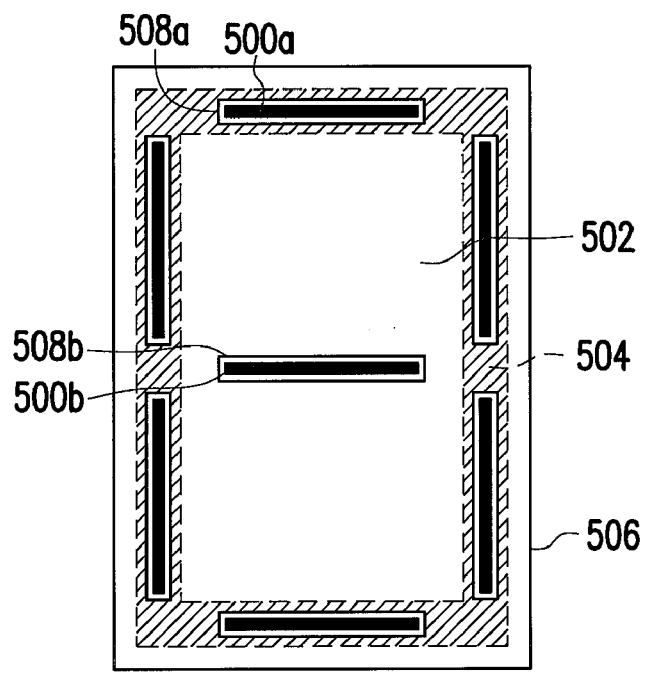
Figure 10:
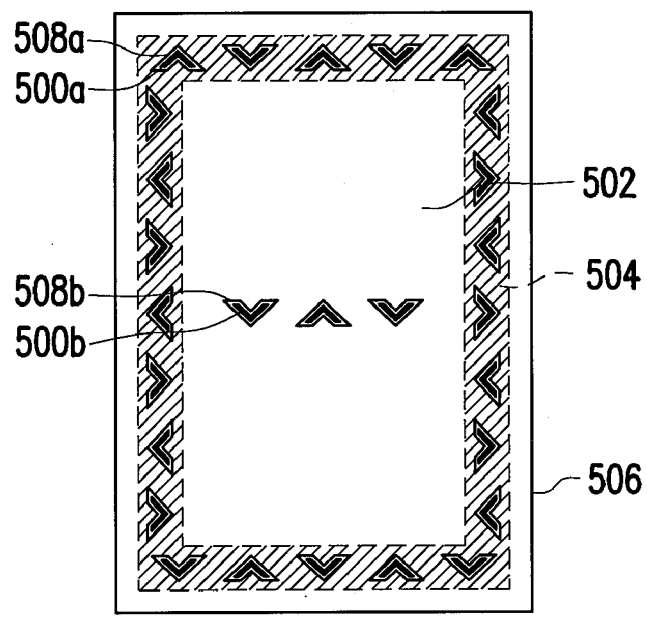

Similarly, the present invention is not limited to the shape of the openings 508a and 508b and the island electrodes 500a and 500b; as a matter of fact, they can be in the form of any shape of polygons shown in FIG. 8, bar shapes shown in FIG. 9, or can be bend shapes shown in FIG. 10.

The pixel structure of the color filtering array substrate shown in FIGS. 3 to 10 is a pixel structure suitable for the storage capacitance on common. If the pixel structure is a pixel structure suitable for the storage capacitance on gate, the specific positions for disposing the opening 508b (and the island electrode 500b) should be changed accordingly; namely, they should be overlaid or aligned with the scan line as shown in FIGS. 11A and 11B. Similarly, all different types of the opening and the island electrode can be applied in the pixel structure of FIG. 11B.

It is to be noted that the first embodiment mainly provides a pixel structure for the active device array substrate, and the second embodiment mainly provides a pixel structure for the color filtering array substrate. As a result, both pixel structures can provide a fast response time under normal display driving. The liquid crystal display panel of the present invention (shown in FIG. 12) comprises an active device array substrate 702, a color filtering array substrate 704, and a liquid crystal layer 706. In an embodiment of the present invention, the pixel structure disclosed in the first embodiment may be optionally selected as the pixel structure of the active device array substrate 702, and the conventional pixel structure of the color filtering array substrate is used as the pixel structure of the color filtering array substrate 704. In another embodiment, the conventional pixel structure of the active device array substrate is used as the pixel structure of the active device array substrate 702, and the pixel structure disclosed in the second embodiment may be optionally selected as the pixel structure of the color filtering array substrate 704. In yet another embodiment, the pixel structure disclosed in the first embodiment is used as the pixel structure on the active device array substrate 702, and the pixel structure disclosed in the second embodiment is optionally selected as the pixel structure of the color filtering substrate 704.

In summary, the pixel structure and the liquid crystal display panel, according to the present invention, have at least the following advantages:

1. In the pixel structure of the active device array substrate, a transverse electric field is formed between the island electrode and the pixel electrode. Therefore, when the pixel structure of the present invention is applied in the OCB LCD, the arrangement of the liquid crystal molecules in some areas is changed. When the liquid crystal display panel displays an image, the rest of the liquid crystal molecules are quickly transited to the bend state, such that the response time of the liquid crystal display panel is effectively improved.

2. In the pixel structure of the color filtering array substrate, the electrode layer has at least one opening that is located above the black matrix layer. Therefore, when the pixel structure of the present invention is applied in the OCB LCD, the arrangement of the liquid crystal molecules in some areas is changed, which reduces the response time of the liquid crystal display panel, and the liquid crystal molecules in such area are shielded by the black matrix, such that the light leakage problem is eliminated.

3. The fabrication of the pixel structure and the liquid crystal display panel is compatible with the fabricating process currently used in the field. Therefore, it is not required to purchase additional fabricating equipment except for modifying the design of some photo masks.

Although the invention has been described with reference to particular embodiments thereof, it will be apparent to one of ordinary skills in the art that modifications to the described embodiments may be made without departing from the spirit of the invention. Accordingly, the scope of the invention is defined by the appended claims.

What is claimed is:

1. A pixel structure of a color filtering array substrate, comprising:
   a color filtering layer;
   a black matrix layer surrounding the color filtering layer;
   an electrode layer covering the color filtering layer and the black matrix layer, wherein the electrode layer has at least one opening, and the at least one opening is correspondingly located above the black matrix layer; and
   at least one island electrode disposed inside the at least one opening, wherein the at least one island electrode is electrically insulated from the electrode layer.

2. The pixel structure of the color filtering array substrate of claim 1, wherein the electrode layer is made of a material substantially the same as that of the at least one island electrode.

3. The pixel structure of the color filtering array substrate of claim 1, wherein the at least one opening is further formed in the electrode layer above the color filtering layer, and the at least one island electrode is disposed inside the at least one opening.

4. The pixel structure of the color filtering array substrate of claim 1, wherein the at least one opening is formed in the electrode layer above the color filtering layer.

* * * * *